W. KIESER.
GOVERNING MECHANISM FOR MIXED PRESSURE TURBINES.
APPLICATION FILED JAN. 18, 1915.

1,150,682.

Patented Aug. 17, 1915

Witnesses:

Inventor:
Walter Kieser,
by: His Attorney.

UNITED STATES PATENT OFFICE.

WALTER KIESER, OF CHARLOTTENBURG, GERMANY, ASSIGNOR TO GENERAL ELECTRIC COMPANY, A CORPORATION OF NEW YORK.

GOVERNING MECHANISM FOR MIXED-PRESSURE TURBINES.

1,150,882.

Specification of Letters Patent.   Patented Aug. 17, 1915.

Application filed January 18, 1915.  Serial No. 2,993.

*To all whom it may concern:*

Be it known that I, WALTER KIESER, a citizen of the Swiss Republic, residing at Charlottenburg, Germany, have invented certain new and useful Improvements in Governing Mechanism for Mixed-Pressure Turbines, of which the following is a specification.

The present invention relates to governing mechanism for mixed pressure turbines in which the admission valve means for the high and low pressure sources are moved in the same sense in response to the control of a speed governor and in the opposite sense in response to the control of a pressure regulator, that is to say one valve means opens while the other closes.

My improvement comprises in a mechanism of the general character described the addition of means whereby the travel of the pressure regulator is limited or controlled by the position of the speed governor.

Figure 1:
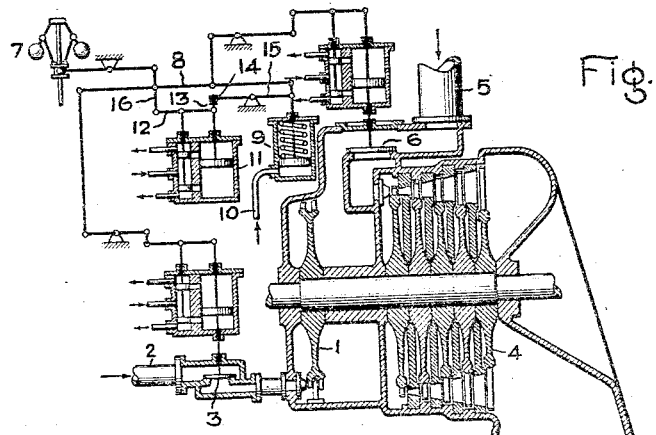
Figure 2:
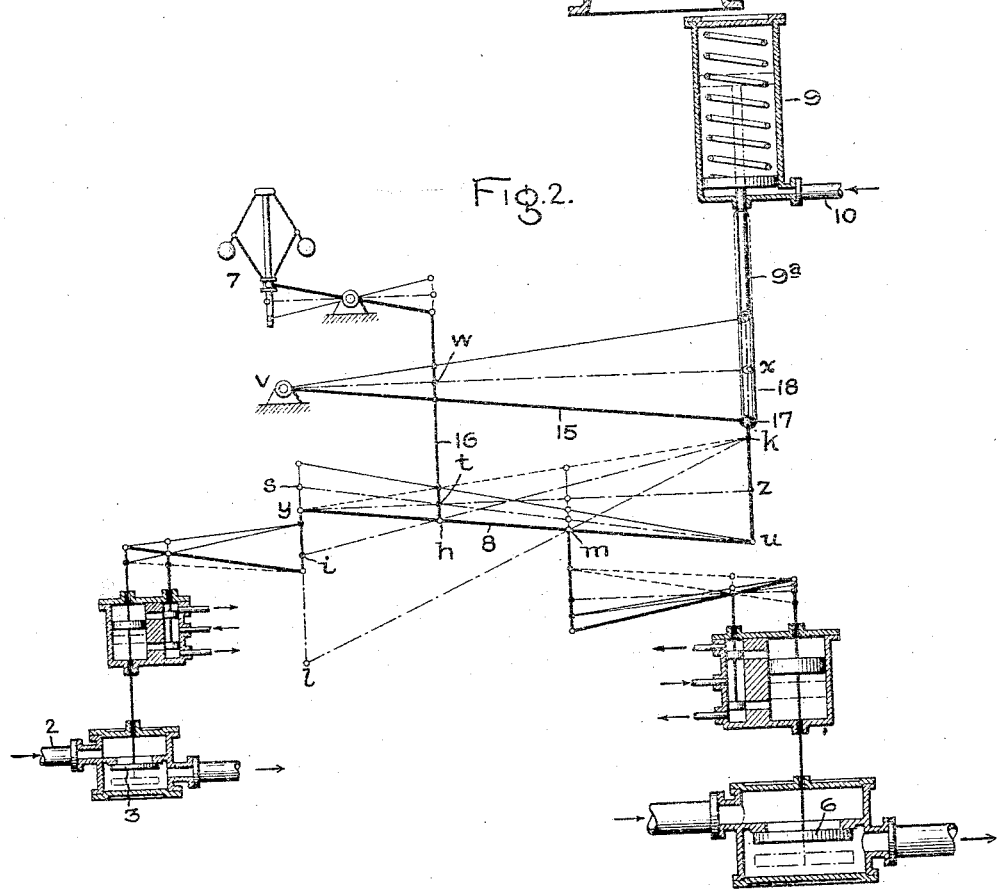

In the accompanying drawing, Figure 1 is a diagrammatic sectional view of a mixed pressure turbine embodying the invention, and Fig. 2 is a view illustrating the governing devices diagrammatically.

The turbine has a high pressure wheel 1 receiving steam from a pipe 2 controlled by a valve 3. The low pressure wheels 4 are supplied with steam from any suitable low pressure source, such as a receiver or accumulator connected to the pipe 5. A valve 6 controls the admission of the low pressure steam to the wheels 4. A speed governor 7 of any approved type and driven by the turbine, controls the valves 3 and 6 through a system of levers and links and servomotors in such manner that both valves are operated in the same direction. To the main floating lever 8 to which the speed governor is connected, a pressure-responsive device 9 is also connected, at such a point that it causes the valves 3 and 6 to be operated in opposite directions. A pipe 10 connects the pressure regulator with the receiver or accumulator for low pressure steam.

A servomotor 11 is controlled by the speed governor, preferably through a lever 12 connected to the lever 8, so that its piston comes to rest in a position corresponding to the desired opening of the high pressure valve 3. This servomotor determines to what extent the pressure regulator shall move in case the supply of low pressure steam increases. Preferably the lever 12 or the piston rod of the servomotor has a collar 13 above which an eye 14 fits loosely on the rod; said eye being connected to the movable abutment of the pressure regulator. When said regulator acts, the eye moves freely until it brings up against the collar and arrests further movement of the pressure regulator.

It will thus be seen that the lower end position of the piston of the regulator 9 is determined by the bottom wall of the cylinder and that the upper end position of the piston is determined by the speed governor 7 through the coöperation of the servo-motor 11. Therefore, as a higher or lower position is determined by the governor for the piston of the servo-motor and the collar 13 the two arm lever 15 which moves about a fixed fulcrum and is moved by the pressure regulator 9 will engage its collar or stop 13 earlier or later so that further upward movement of the piston and rod of said regulator are prevented. Inasmuch as the eye 14 on lever 15 slides freely on the piston rod carrying the collar 13 it follows that the piston of the regulator 9 can move freely downward as the pressure of the fluid admitted by the pipe 10 decreases. By reason of the arrangement described a limitation of the movement of the pressure regulator is obtained without changing the tension of the spring in the regulator.

A diagram illustrating the principle of operation of the invention is shown in Fig. 2. The high pressure valve 3 and the low pressure valve 6 are operated by servomotors controlled by the speed governor 7 through a floating lever 8 connected at one end by a rod $9^a$ to the movable abutment of the pressure regulator 9. A lever 15, fulcrumed at $v$, is pivoted to the link 16 which connects the speed governor with the floating lever 8. At the free end of the lever 15 is a pin 17 working in a long loop 18 forming part of the rod $9^a$. The pin serves as a stop for the loop and forms a lost motion device which allows the pressure regulator, during pressure changes, a greater or smaller freedom of motion, depending upon the position of the speed governor.

Suppose the machine is working with high pressure steam at half load, which corresponds to the position $s\ t\ u$ of the lever 8. The position of the lever 15 is then $v\ w\ x$. If the pressure of the exhaust steam in the accumulator rises suddenly, the pressure regulator lifts the rod 9ᵃ and turns the lever 8 about the point $t$. The pin 17, however, checks the upward movement of the rod 9ᵃ when the bottom of the loop reaches the point $x$, so that $y\ t\ z$ is the new position of the lever 8, and an overregulation, with a corresponding changing speed, is avoided.

The diagram also illustrates the difficulties experienced with the previous arrangements of valves and controlling devices, referred to at the beginning of this specification. Suppose the position of the floating lever 8, shown in the heavy line, to be that determined by the speed governor at no load and with only high pressure steam operation. Now with this position of the governor, when the exhaust steam pressure rises and the pressure regulator tends accordingly to effect a change from high pressure to low pressure operation; then, with the arrangement heretofore in use, the lever 8 first turned about the pivot $h$ and took the position $i\ h\ k$. In this position, however, the machine would race, so that the speed governor would have to come into play to partially shut the low pressure valve, which would lead to a position $l\ m\ k$ of the lever 8. From this it will be seen that the high pressure valve would have to have a considerable dead path and be provided with proper overlap.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. The combination with a mixed pressure turbine, of a speed governor and a pressure regulator therefor, and means for limiting the travel of the pressure regulator according to the position of the speed governor.

2. The combination with a mixed pressure turbine, of a speed governor and a pressure regulator therefor, a floating lever to which the governor and the regulator are connected, and means controlled by said floating lever for limiting the travel of the pressure regulator according to the position of the speed governor.

3. The combination with a mixed pressure turbine, of a speed governor and a pressure regulator therefor, a floating lever to which the governor and the regulator are connected, and a lost motion device controlled by said floating lever for limiting the travel of the pressure regulator according to the position of the speed governor.

4. The combination with a mixed pressure turbine, of a speed governor and a pressure regulator therefor, a floating lever to which the speed governor and the pressure regulator are connected, a second lever actuated by said floating lever, and a device moving with the pressure regulator and adapted to strike and be checked by said second lever.

5. In a governing device for mixed pressure steam machines, in which the live steam inlet valve means and the exhaust steam inlet valve means are moved by a speed governing valve means in the same sense and, depending on a pressure regulator, in opposite senses, the limiting of the travel of the pressure regulator being responsive to the position of the speed regulator.

6. The combination with a mixed pressure turbine, of valves admitting high and low pressure motive fluid to the turbine, a speed governor driven by the turbine for controlling the valves, a pressure regulator for modifying the action of the governor on one of the valves, and a means for restricting the action of the regulator which is controlled by the speed governor.

7. The combination with a mixed pressure turbine, of valves admitting high and low pressure motive fluid to the turbine, a speed governor driven by the turbine for controlling the valves, a pressure regulator for modifying the action of the governor on one of the valves which comprises relatively movable members subject to the action of low pressure motive fluid, and a stop for one of said members which is adjustable in response to movements of the speed governor.

8. The combination with a mixed pressure turbine, of valves admitting high and low pressure motive fluid to the turbine, a speed governor driven by the turbine for causing the valves to move in the same sense in response to speed variations, a regulator for causing the valves to move in the opposite sense under variations in fluid pressure, and a means responsive to the control of the speed governor for limiting the range of action of the regulator.

9. The combination with a mixed pressure turbine, of valves admitting high and low pressure motive fluid to the turbine, a speed governor driven by the turbine for causing the valves to move in the same sense in response to speed variations, a regulator for causing the valves to move in the opposite sense under variations in fluid pressure, a servo-motor for changing the position of a stop to limit the range of action of the regulator, and means actuated by the governor for controlling the servo-motor.

10. The combination with a mixed pressure turbine, of valves admitting high and low pressure motive fluid to the turbine, a speed governor driven by the turbine for controlling the valves, a main floating lever which is connected to both valves, a pressure regulator that is also connected to the lever, an auxiliary floating lever which is connected to a moving member of the regulator, a servo-motor which moves a stop that limits the range of action of the regulator, and means controlling the servo-motor in response to the action of the governor.

11. The combination with a mixed pressure turbine, of valves controlling the admission of high and low pressure fluid to the turbine, a governor that controls said valves, a main floating lever that is connected to both valves, a pressure regulator which moves in response to changes of pressure of the low pressure source of supply, an auxiliary floating lever that is connected to a movable member of the regulator, a servo-motor which moves a stop that limits the range of action of the regulator, and a means connecting the pilot valve of the servo-motor with the main floating lever, the governor and the piston of said motor.

In witness whereof, I have hereunto set my hand this second day of January, 1915.

WALTER KIESER.

Witnesses:
WILLY NEUMANN,
ERNST HÖHN.